United States Patent [19]

Hockett

[11] Patent Number: 4,666,193

[45] Date of Patent: May 19, 1987

[54] PIPE COUPLING

[75] Inventor: Wayne B. Hockett, Tampa, Fla.

[73] Assignee: Hockett Systems, Inc., Tampa, Fla.

[21] Appl. No.: 627,780

[22] Filed: Jul. 5, 1984

[51] Int. Cl.[4] .............................................. F16L 25/00

[52] U.S. Cl. ................................ 285/334.3; 285/238; 285/370; 285/404; 285/915; 285/360

[58] Field of Search ............... 285/334.1, 334.4, 334.2, 285/334.3, 370, 371, 73, 74, 360, 238, 910, 410, 915

[56] References Cited

U.S. PATENT DOCUMENTS

| | | | |
|---|---|---|---|
| 874,390 | 12/1907 | Carel | 285/370 X |
| 1,196,928 | 9/1916 | Bylund | 285/334.3 X |
| 1,337,427 | 4/1920 | Beach | 285/334.3 X |
| 2,204,392 | 6/1940 | Arm | 285/73 |
| 2,287,142 | 6/1942 | Simmonds | 285/371 X |
| 2,900,199 | 8/1959 | Logan | 285/370 X |
| 3,406,989 | 10/1968 | Gross | 285/370 X |
| 3,840,257 | 10/1974 | Moore | 285/910 |
| 4,524,997 | 6/1985 | Ebert | 285/74 |

FOREIGN PATENT DOCUMENTS

| | | | |
|---|---|---|---|
| 109518 | 1/1900 | Fed. Rep. of Germany | 285/74 |
| 516989 | 7/1957 | Italy | 285/371 |

*Primary Examiner*—Dave W. Arola

*Attorney, Agent, or Firm*—Frijouf, Rust & Pyle

[57] ABSTRACT

A pipe coupling is disclosed for coupling together complimentary flexible hoses. The pipe coupling includes a first tubular member having a first and a second end, the first end of the first member defining a first bore and a first counterbore. A second tubular member has a first and a second end and the first end of the second member defines a second bore and a second counterbore. The second counterbore is of the same diameter as the first counterbore and is aligned with the first counterbore when the first and the second members are coupled together. A tubular insert includes a first and a second end and the insert extends between the first and the second bores such that the external surface of the insert engages the first and the second bores with the first end of the insert being disposed adjacent the first bore and the second end of the insert being disposed adjacent the second bore. An annular seal is disposed in an annular space defined by the first and the second counterbores and the insert. The annular seal seals the first and the second members together when the members are coupled together.

9 Claims, 16 Drawing Figures

PIPE COUPLING

BACKGROUND OF THE INVENTION

1. Field of the Invention

This invention relates to a pipe coupling for coupling together complimentary flexible hoses. More particularly, this invention relates to pipe couplings of the type known in the art as quick couplings and the like.

2. Information Disclosure Statement

Over the years many different types of so-called "quick couplings" have been proposed for joining together lengths of flexible hose for the conveyance of fluid material. The majority of these prior art proposals include a pair of complimentary coupling members each including an annular flexible seal removably entrapped within an annular groove defined by the coupling end of the respective members. When the respective coupling members are coupled together, the protruding ends of the annular flexible seals abut against each other to form a fluid tight seal between the respective members. One such prior art proposal is manufactured by National Equipment Corp. who produce such quick couplings under the registered trademark "NECO".

However, although the aforementioned pipe couplings provide an adequate seal for the conveyance of relatively non-abrasive fluids, problems have been experienced when such quick couplings are used for the conveyance of sand during sand-blasting operations, in that the flexible seals are exposed to the abrasive action of the sand as the sand passes through the flexible hose coupling.

The present invention overcomes the aforementioned problem by providing an abrasive resistant insert which isolates the annular flexible seal from direct contact with the stream of abrasive sand or the like.

Furthermore, in the prior art pipe couplings, the distal end of the flexible hose has customarily been secured within the bore of the pipe coupling member by providing radially drilled holes within the coupling member along the length thereof such that when the hose has been inserted within the bore of the coupling member, self-tapping screws are inserted through the radial holes to engage the distal end of the flexible hose and secure the same within the coupling member.

With such prior art means of securing the flexible hose within the pipe coupling member the pressure of the fluid being conveyed within the hose is to a large extent relied upon in order to maintain an effective seal between the distal end of the flexible pipe and the bore of the coupling member.

A need has existed in the art of a method of firmly securing and sealing the distal end of the flexible pipe within the coupling member such that the pressure within the flexible pipe caused by the passage therethrough of the fluid being conveyed is not relied upon to seal the distal end of the flexible pipe within the coupling member.

Therefore, it is the primary object of this invention to provide a pipe coupling that overcomes the aforementioned inadequacies and disadvantages of the prior art devices by providing an annular seal that is isolated from the flow path of the abrasive materials being conveyed through the pipe coupling and a method of securing and sealing the coupling member to the flexible pipe.

Another object of this invention is to provide an improved method of manufacturing a pipe coupling of the "quick coupling" type such that the pressure of the fluid being conveyed is not relied upon for maintaining a seal between the flexible pipe and the coupling member.

Another object of the present invention is the provision of a pipe coupling including a first and a second member in which the first and the second members respectively include bores and counterbores disposed such that the counterbores are of the same diameter and are aligned relative to each other when the respective coupling members are coupled together.

Another object of the present invention is the provision of a pipe coupling in which a tubular insert in disposed adjacent the respective bores of the coupling members, the insert extending between the coupling memberse to define together with the counterbores an annular space for the reception therein of an annular sealing ring.

Another object of the present invention is the provision of a method of anchoring the distal end of a flexible pipe within the third bore of a coupling member which includes accurately machining the distal end of the flexible pipe and inserting the same within the third bore of the coupling member. A flexible skirt is stretched over the second end of the coupling member such that the flexible skirt encircles, engages and is glued to the second end of the coupling member. The annular passage between the second end of the flexible skirt and the coupling member is filled with a liquid cement by pumping the liquid cement between the hose and the third bore or the liquid cement is allowed to seep under gravity between the external surface of the hose and the third bore to provide sealed engagement between the flexible hose and the coupling member. Finally the flexible skirt is released such that the second end of the flexible skirt tightly encircles the flexible hose.

The foregoing has outlined some of the more pertinent objects of the present invention. These objects should be construed to be merely illustrative of some of the more prominent features and applications of the invention. Many other beneficial results can be obtained by applying the disclosed invention in a different manner or modifying the invention within the scope of the disclosure. Particularly with regatd to the use of the invention disclosed herein, this should not be construed as being limited to pipe couplings of the bayonet type fit and known in the art as "quick couplings" but should include couplings of any type used for coupling together flexible hose or the like.

SUMMARY OF THE INVENTION

The pipe coupling of the present invention is defined by the appended claims with a specific embodiment shown in the attached drawings. For the purpose of summarizing the invention, the invention relates to a pipe coupling for coupling together complimentary flexible hoses and a method of securing and sealing a flexible hose within a coupling member. The pipe coupling comprises a first tubular member having a first and a second end. The first end of the first member defines a first bore and a first counterbore. A second tubular member includes a first and a second end and the first end of the second member defines a second bore and second counterbore such that the second counterbore is of the same diameter as the first counterbore and is aligned with the first counterbore when the first and the second members are coupled together. A tubular insert having a first and a second end extends between the first and the second bores such that the external surface of the insert engages the first and the second bores and the first end of the insert is disposed adjacent the first bore and the second end of the insert is disposed adjacent the second bore. An annular seal is disposed within an annular space defined by the first and the second counterbores and the insert for sealing the first and the second members together when the members are coupled together.

More specifically, the tubular insert is of an abrasion resistant metal and has a length which is equal to the sum of the lengths of the bores and counterbores. The insert is of a diameter such that the insert forms an interference fit with the respective bores. The respective bore and counterbore of each of the respective coupling members define therebetween a first and a second shoulder respectively such that an annular rubber ring disposed within the annular space is compressed within the space between the first and the second shoulders when the respective coupling members are coupled together.

The present invention also includes a method for securing and sealing the distal end of a flexible hose within a third bore of a coupling member. The method includes the step of inserting the distal end of the flexible hose into the third bore of the first tubular member until the distal end of the flexible hose abuts against the end of the insert. A flexible skirt is stretched over the second end of the first member and the skirt is released such that the first end of the skirt tightly engages, encircles and is glued to the second end of the first member. The second end of the flexible skirt is maintained in a radially stretched disposition thereof for providing an annular passage between the second end of the flexible skirt and the hose. Adhesive is pumped between the external surface of the hose and the third counterbore. Finally, the second end of the flexible skirt is permitted to move radially inwardly to tightly encircle and engage the external surface of the flexible hose when the liquid cement has been pumped between the hose and the third bore for sealing and securing the distal end of the flexible hose within the coupling member.

The foregoing has outlined rather broadly, the more pertinent and important features of the present invention in order that the detailed description of the invention that follows may be better understood so the present contribution to the art can be more fully appreciated. Additionally, features of the invention will be described hereinafter which form the subject of the claims of the invention. It should be appreciated by the skilled in the art that the conception and specific embodiment disclosed may be readily utilized as a basis for modifying or designing other devices for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following description taken in conjunction with the accompanying drawings in which:

FIGS. 12–16 illustrate the various steps involved in securing and sealing the distal end of a flexible hose within one of the tubular members, in which:

FIG. 12 shows the tubular member and the distal end of the flexible hose.

FIG. 13 shows the distal end of the hose inserted within the third bore of the first member.

FIG. 14 shows the first end of the flexible skirt encircling and engaging the second end of the first member and the second end of the flexible skirt being extended and stretched radially to define an annular passage for the reception therein of the liquid cement.

FIG. 15 shows the liquid cement having been pumped along the external surface of the distal end of the flexible pipe between the pipe and the first member and the second end of the flexible skirt having been released to tightly engage the external surface of the flexible pipe.

FIG. 16 shows the first member securely anchored and sealed to the distal end of the flexible pipe.

Similar reference characters refer to similar parts throughout the several views of the drawings.

DETAILED DESCRIPTION

Figure 1:
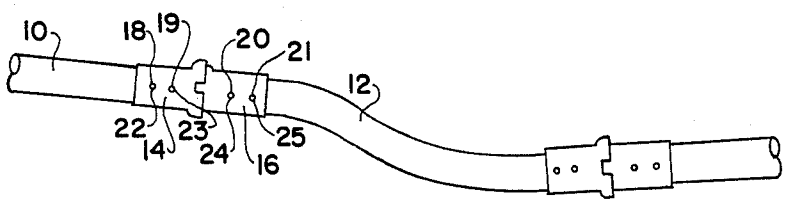
FIG. 1 is a fragmentary view of a pair of prior art pipe couplings of the quick coupling type.
Figure 3:
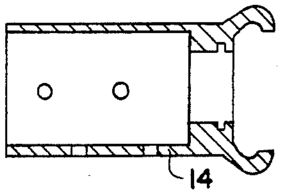
FIG. 3 is a sectional view taken on the line 3—3 of FIG. 2.
Figure 2:
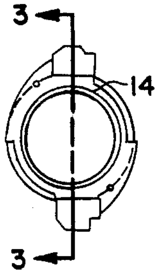
FIG. 2 is an enlarged end view of one of the prior art coupling members.
Figure 4:
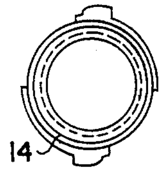
FIG. 4 is a view taken from the opposite end shown in FIG. 2.

FIGS. 1–5 are various views of a prior art pipe coupling of the so called "quick coupling" type used for coupling together two flexible pipes 10 and 12 respectively. The two flexible pipes 10 and 12 are anchored respectively within bores of a first and second tubular member 14 and 16 respectively. The first and second tubular members 14 and 16 define a plurality of radially extending holes 18, 19, 20 and 21 such that when the distal ends of the flexible pipes 10 and 12 are inserted within the respective bores of the tubular members 14 and 16, self-tapping screws 22, 23, 24 and 25 are inserted through the holes 18-21 and are screwed into the respective walls of the flexible pipes 10 and 12 to anchor the same within the tubular members.

Figure 5:
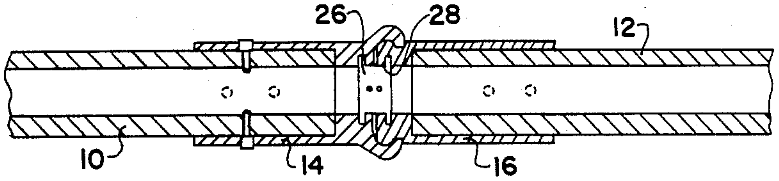
FIG. 5 is a sectional view of a prior art first and second coupling member which are coupled together showing the adjacent annular sealing rings abutting against each other.
Figure 6:
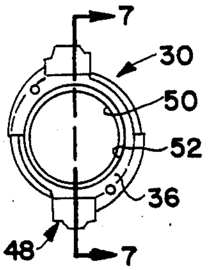
FIG. 6 is an end view of the first coupling member of the present invention viewed from the first end thereof.
Figure 7:
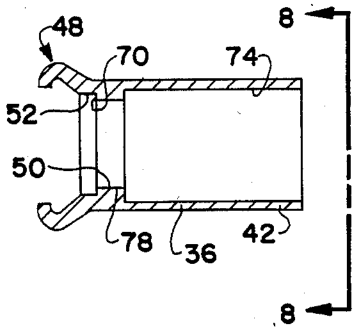
FIG. 7 is a sectional view of the first coupling member taken on the line 7—7 of FIG. 6.
Figure 8:
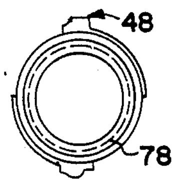
FIG. 8 is a view taken on the 8—8 of FIG. 7.

The prior art pipe coupling shown in FIG. 5 also includes annular rings 26 and 28 of sealing material which are entrapped within annular grooves formed at the first end of the coupling members such that a portion of each of the annular sealing rings protrudes axially relative to the tubular member. When the first and the second tubular members 14 and 16 are coupled together, the respective annular sealing rings abut against each other and are compressed against each other to provide a seal between the respective tubular members 14 and 16.

FIGS. 6–11 show the various components of the pipe coupling generally designated 30 of the present invention. As shown more particularly in FIG. 11 the pipe coupling 30 includes a first and a second flexible hose 32 and 34 which are joined together by means of a first and a second tubular member 36 and 38 respectively. The first tubular member 36 includes a first and a second end 40 and 42 respectively and the second tubular member 38 includes a first and second end 44 and 46 respectively such that the first ends 40 and 44 of the first and second tubular members 36 and 38 are coupled together by means of a bayonet coupling generally designated 48 of a type well-known to those skilled in the art. As shown more particularly with reference to FIG. 11 the first tubular member 36 defines a first bore 50 and counterbore 52 such that the first counterbore 52 is disposed at the first end 40 of the first member 36. Also, the second tubular member 38 defines a second bore 54 and a second counterbore 56 such that the second counterbore 56 is disposed at the first end 44 of the second member 38 and is aligned with the first counterbore 52, and the second member 38 is of the same diameter as the first counterbore 52.

Figure 9:
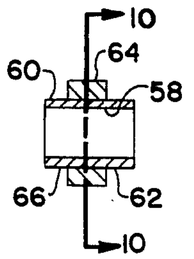
FIG. 9 is a sectional view of the tubular insert together with the annular sealing ring.
Figure 10:
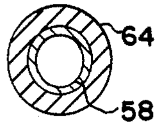
FIG. 10 is a sectional view taken on the line 10—10 of FIG. 9.

FIG. 9 shows a metallic insert 58 which is inserted within the respective bores 50 and 54 of the first and second members 36 and 38 such that the first end 60 of the insert 58 is inserted within the first bore 50 of the first member 36 and the second end 62 of the insert 58 is inserted within the second bore 54 of the second member 38. A rubber sealing ring 64 of annular configuration closely conforms to the external surface 66 of the insert 58 such that the annular sealing ring 64 is disposed within an annular space 68 defined by the external surface 66 of the insert 58 and the first and second counterbores 52 and 56 respectively.

Figure 11:
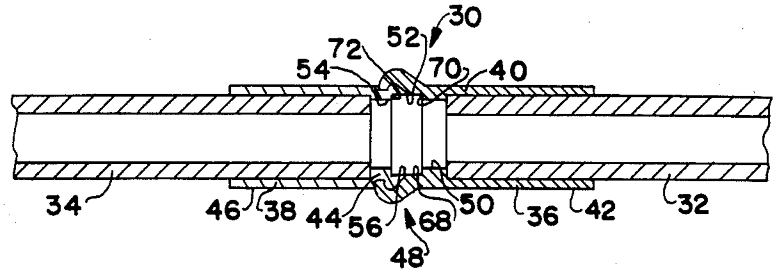
FIG. 11 is a sectional view of the first and the second tubular members coupled together with the annular sealing ring disposed within the annular space.

FIG. 11 shows the annular seal ring 64 disposed between the respective tubular members 36 and 38. A first shoulder 70 is defined by the first bore 50 and the first counterbore 52 and a second shoulder 72 is defined by the second bore 54 and the second counterbore 56 respectively such that when the annular seal ring 64 is disposed between the first and second shoulders 70 and 72 respectively. The seal ring 64 is compressed into sealing engagement with the first and the second tubular members 36 and 38 respectively when the members 36 and 38 are coupled together.

FIGS. 12–16 illustrate the various steps involved in securing and sealing the distal end of the first flexible pipe 32 within a third bore 74 defined by the first member 36.

Figure 12:
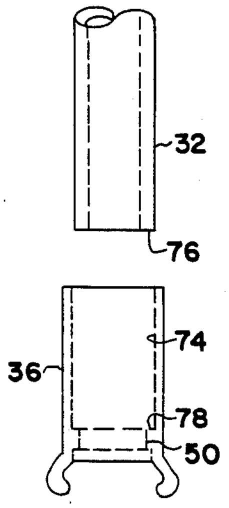
Figure 13:
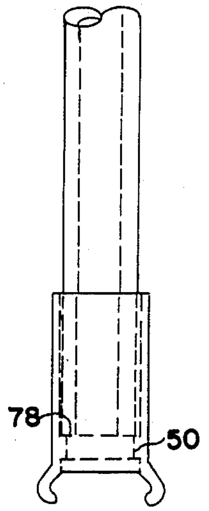

As shown in FIG. 12, the distal end of the flexible pipe 32 is accurately machined such that the distal end is normal to the longitudinal axis of the flexible pipe. The first flexible pipe 32 is inserted within the third bore 74 of the first member 36 until the distal end 76 of the flexible pipe 32 abuts against a ledge 78 defined between the third bore 74 and the first bore 50 as shown in FIG. 13.

Figure 14:
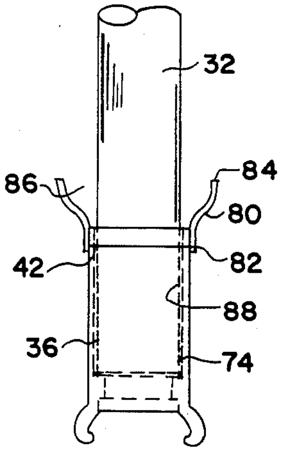

FIG. 14 shows a flexible skirt 80 having a first and a second end 82 and 84 respectively. The first end 82 of the flexible skirt 80 is stretched over the second end 42 of the first tubular member 36 and is glued and permitted to tightly encircle and engage the second end 42 thereof. The second end 84 of the flexible skirt 80 is stretched radially relative to the flexible hose 32 to define an annular passage 86 between the second end 84 of the flexible skirt 80 and the flexible hose 32. A liquid cement of a type well-known in the art is pumped by a high pressure grease gun or the like into the annular clearance the external surface the hose and the third bore. An elongate metal tube having a relatively small diameter may be used for injecting the liquid cement or the liquid cement is poured into the annular passage 86 and permitted to seep under the force of gravity between the external surface 88 of the flexible pipe 32 and the third bore 74 of the first member 36.

Figure 15:
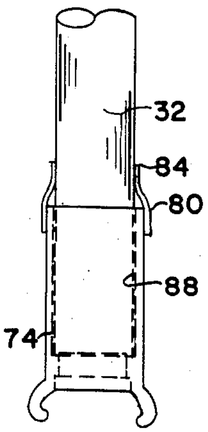

As shown in FIG. 15, when the liquid cement has seeped into the space between the external surface 88 of the flexible pipe 32 and the third bore 74, the second end 84 of the flexible skirt 80 is released to permit the same to firmly encircle and engage the external surface 88 of the flexible pipe 32.

Figure 16:
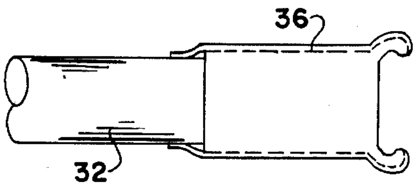

FIG. 16 shows the first member 36 securely fastened to and sealed to the distal end 76 of the flexible pipe 32 to provide sealing engagement therewith that is not dependant upon the pressure within the flexible pipe for maintaining close conformity of the external surface of the flexible pipe with the third bore 74.

In operation of the invention as shown in FIGS. 6–16 the conventional radially extending holes 18-21 are plugged by means of heli-arc welding or the like and the flexible pipe 32 is inserted within the third bore 74 of the tubular member 36. Alternatively, the coupling members may be specifically cast without the conventional radially extending holes. The distal end 76 of the flexible pipe 32 is secured and sealed within the third bore 74 using the flexible skirt 80 as described hereinbefore. The liquid cement is permitted to slowly seep downwardly under the force of gravity or is pumped into the interstices between the external surface of the flexible pipe and the third bore 74 of the first member 36.

The various steps are repeated with the second flexible pipe 34 which is inserted within the third bore of the second tubular member 38 and when both the first and second tubular members 36 and 38 have been secured and sealed to the respective flexible pipes, the annular sealing ring 64 is slipped over the outer surface of the insert 58 such that the annular sealing ring 64 is disposed approximately midway between the first and the second ends 60 and 62 of the insert 58. The first end 60 of the insert 58 is inserted within the bore 50 of the first member 36 and the second end 62 of the insert 58 is guided into the second bore 54 of the second member 38 such that when the first and second members 36 and 38 are coupled together the annular seal 64 is compressed between the first and second shoulders 70 and 72 respectively to form a seal between the first and second members.

The present invention provides a pipe coupling which is easily manufactured and which isolates the annular seal from the abrasive effects of the fluid being conveyed through the pipe coupling.

Furthermore, the pipe coupling of the present invention provides a method of securing and sealing a distal end of a flexible pipe within a bore of the tubular member such that sealing between the pipe and the tubular member is not dependant upon the pressure within the flexible pipe when fluid is being conveyed through the pipe coupling. Also, the pipe coupling of the present invention avoids the necessity of providing two rubber sealing rings and an undercut groove within each tubular member for the reception of the rings.

The present disclosure includes that contained in the appended claims, as well as that of the foregoing description. Although the invention has been described in its preferred form with a certain degree of particularity, it is understood that the present disclosure of the preferred form has been made only by way of example, that numerous changes in the details of construction and the combination and arrangement of parts may be resorted to without departing from the spirit and scope of the invention.

What is claimed is:

1. A coupling for coupling complementary flexible hoses, said coupling comprising:

a first tubular member having a first and a second end, said first end of said first member defining a first bore and a first counterbore;

a second tubular member having a first and a second end, said first end of said second member defining a second bore and a second counterbore;

said first counterbore being of the same diameter as said second counterbore;

a tubular insert having a first and a second end, said insert extending between said first and said second bores;

said tubular insert including an external surface such that said external surface of said insert engages said first and second bores with said first end of said insert being disposed adjacent said first bore and with said second end of said insert being disposed adjacent said second bore;

said second ends respectively of said first and said second tubular members define third bores for the reception therein of the respective flexible hose;

means for fastening in use the respective flexible hoses internal said first and second tubular member, respectively;

means for coupling together said first end of said first tubular member and said first end of said second tubular member such that said first counterbore is aligned with said second counterbore when said first and second tubular members are coupled together;

an annular seal disposed within an annular space defined by said first and second counterbores and said tubular insert for sealing said first and said second tubular members together when said members are coupled together;

said annular seal is of a compressible material;

said first bore and said first counterbore defining a first shoulder and said second bore and said second counterbore defining a second shoulder such that during coupling of said first and said second tubular members together said first and said second shoulders move towards each other to compress said compressible material of said seal into sealing engagement when said members are coupled together; and a ledge defined between said first bore and said third bore of said first and said second tubular members, respectively, such that in use prior to coupling the respective flexible hose abuts said ledge of said first and second tubular members, respectively, and said first and second ends of said tubular insert thereby forcing said first end and said second end of said tubular insert against the respective flexible hose during coupling of said first and said second tubular members together.

2. A pipe coupling as set forth in claim 1 wherein said tubular insert defines a fourth bore which is of the same diameter as the internal bore of the respective flexible hoses.

3. A pipe coupling as set forth in claim 1 wherein the length of said tubular insert is the same as the sum of the lengths of said first and second bores and said first and second counterbores.

4. A pipe coupling as set forth in claim 1 wherein said tubular insert forms an interference fit with said first and said second bores.

5. A pipe coupling as set forth in claim 1 wherein said tubular insert is metal.

6. A pipe coupling as set forth in claim 1 wherein said tubular insert is of an abrasion resistant material.

7. A pipe coupling as set forth in claim 1 wherein said annular seal is of a polymeric material.

8. A pipe coupling as set forth in claim 1 wherein said annular seal is of rubber.

9. A coupling for coupling complementary flexible hoses, said coupling comprising:

a first tubular member having a first and a second end, said first end of said first member defining a first bore and a first counterbore;

a second tubular member having a first and a second end, said first end of said second member defining a second bore and a second counterbore;

said first counterbore being of the same diameter as said second counterbore;

a tubular metallic insert having a first and a second end, said insert extending between said first and said second bores;

said tubular insert including an external surface such that said external surface of said insert engages said first and second bores with said first end of said insert being disposed adjacent said first bore and with said second end of said insert being disposed adjacent said second bore;

said second ends respectively of said first and said second tubular members define third bores for the reception therein of the respective flexible hose;

means for fastening in use the respective flexible hoses internal said first and second tubular member, respectively;

means for coupling together said first end of said first tubular member and said first end of said second tubular member such that said first counterbore is aligned with said second counterbore when said first and second tubular members are coupled together;

an annular seal disposed within an annular spaced defined by said first and second counterbores and said tubular insert for sealing said first and said second tubular members together when said members are coupled together;

said annular seal is of a compressible material;

said first bore and said first counterbore defining a first shoulder and said second bore and said second counterbore defining a second shoulder such that during coupling of said first and said second tubular members together said first and said second shoulders move towards each other to compress said compressible material of said seal into sealing engagement when said members are coupled together; and a ledge defined between said first bore and said third bore of said first and said second tubular members, respectively, such that in use prior to coupling the respective flexible hose abuts said ledge of said first and second tubular members, respectively, and said first and second ends of said tubular insert thereby forcing said first end and said second end of said tubular insert against the respective flexible hose during coupling of said first and said second tubular members together.

* * * * *